May 1, 1956

K. F. WIETZEL ET AL 2,743,692

STRIP WELDING MACHINE

Filed Aug. 11, 1950

Inventors
KARL F. WIETZEL,
WILLIAM V. DOVENBARGER
AND HARRY LA TOUR,
BY
Allen & Allen
Attorneys.

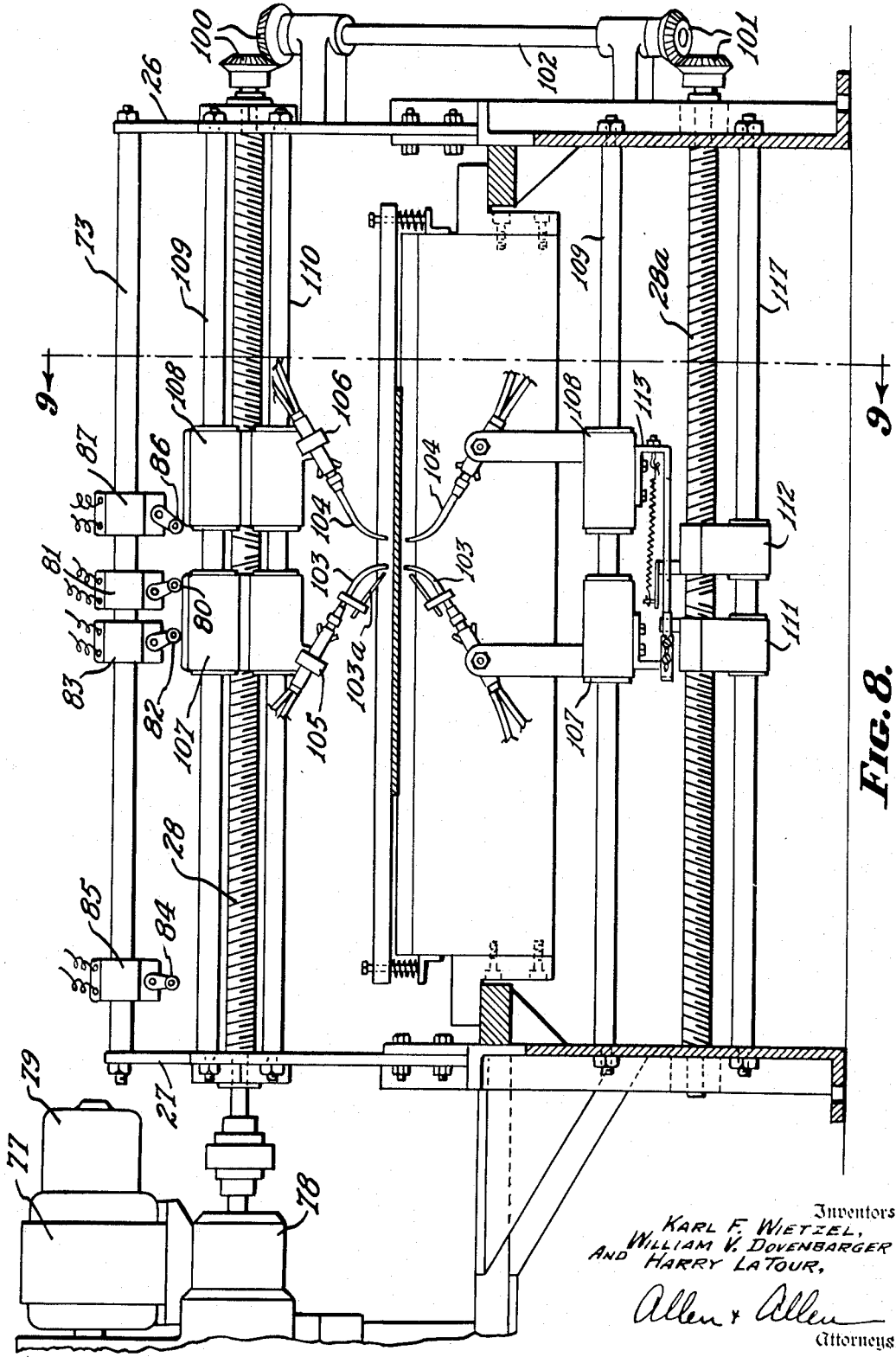

May 1, 1956  K. F. WIETZEL ET AL  2,743,692
STRIP WELDING MACHINE

Filed Aug. 11, 1950  4 Sheets-Sheet 4

Inventors.
KARL F. WIETZEL,
WILLIAM V. DOVENBARGER
AND HARRY LATOUR,

Allen + Allen
Attorneys.

United States Patent Office 2,743,692
Patented May 1, 1956

2,743,692

STRIP WELDING MACHINE

Karl F. Wietzel and William V. Dovenbarger, Zanesville, and Harry La Tour, Middletown, Ohio, assignors to Armco Steel Corporation, Middletown, Ohio, a corporation of Ohio Application August 11, 1950, Serial No. 178,932

14 Claims. (Cl. 113—59)

This invention relates to a strip welding machine, that is, a machine for welding metallic sheets or the like end to end to form a strip, and is a continuation-in-part of our copending application, Serial No. 95,484, filed May 26, 1949, now abandoned.

It has been the practice to weld sheets or strips end to end by means of an apparatus having means for clamping the edges to be welded together in juxtaposition and then passing a welding torch across the strips from side to side to perform the weld. While apparatus of this nature has generally proven satisfactory, trouble has been encountered with imperfections in the weld at the side of the strip where the weld was started. It is therefore an object of the invention to provide an apparatus which is automatic in operation and which has a certain sequence of operations which contribute to making a perfect weld of the seam.

It is a further object of the invention to provide a welding machine in which there are at least two welding torches which are translatable transversely of the strip in opposite directions toward the sheet edges along a joint to be welded, and in which each torch has a translation range exceeding one-half the strip width so that the paths of the torches in the central portion of the strip overlap each other whereby the central portion of the joint is subjected to two welding operations.

It is still another object of the invention to provide an apparatus in which the two welding torches are translated by a common screw having right and left hand threads so that by rotation of the screw in one direction the torches are caused to move in opposite directions.

Still another object of the invention includes the provision of means whereby upon initial activation one of the torches starts to function and the functioning of the other torch on the same side of the strip is delayed until the torch has welded the central portion of the joint, whereupon the second torch is caused to operate, first to go over the initial portion of the weld performed by the first torch, and then to continue its weld toward the opposite edge of the strip.

Still another object of the invention resides in the provision of two pairs of torches, one torch of each pair being above the strip and the other torch of each pair being below the strip and each pair operating as outlined above, the two torches of each pair being connected together for concurrent movement.

These and other objects of the invention which will be pointed out more in detail hereinafter, or which will be apparent to one skilled in the art upon reading these specifications, are accomplished by that certain construction and arrangement of parts of which the drawings illustrate an exemplary embodiment.

Reference is now made to the drawings forming a part hereof and in which

Figure 3 is a view similar to Figure 1, showing the machine in its starting position.

Figure 4 is a fragmentary view similar to Figures 1 and 3 showing the torches in an initial phase of operation.

Figure 5 is a vertical cross-sectional view taken on the line 5—5 of Figure 1.

Figure 6 is a vertical fragmentary cross-sectional view taken on the line 6—6 of Figure 5.

Figure 7 is a fragmentary cross-sectional view on an enlarged scale taken on the line 7—7 of Figure 6.

Figure 8 is a vertical transverse sectional view of a modified machine taken on the line 8—8 of Figure 9.

Figure 1:
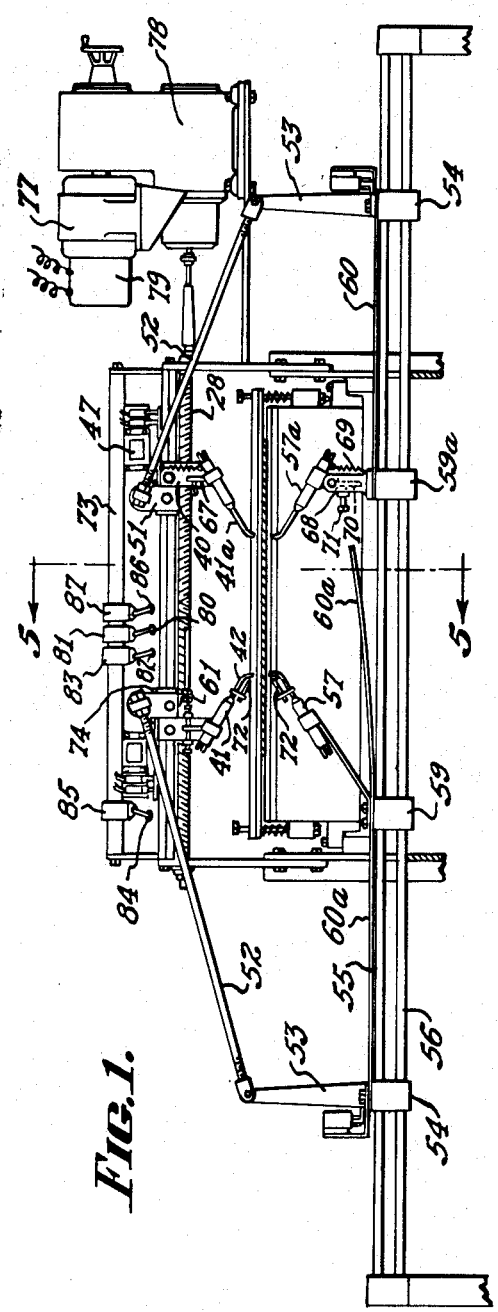
Figure 1 is an elevational view of the machine looking in the direction of strip travel and showing the strip in cross-section as seen on the line 1—1 of Figure 5.
Figure 2:
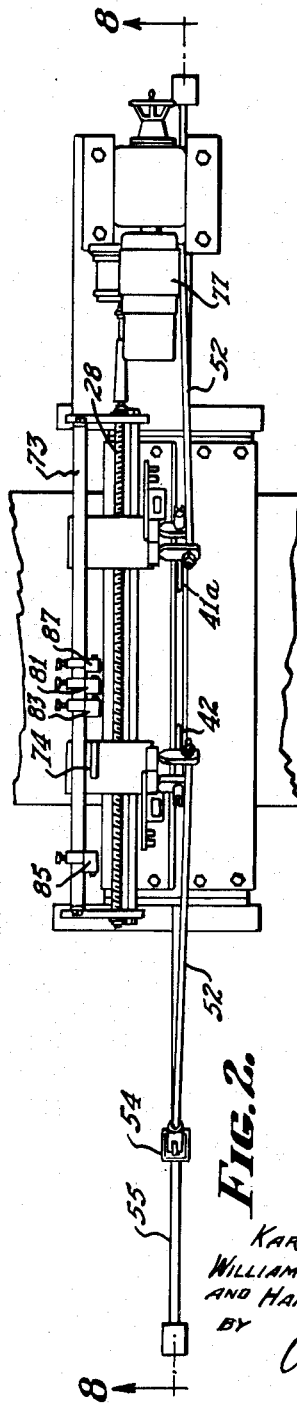
Figure 2 is a plan view of the same.

Briefly, in the practice of the invention clamping means are provided for clamping the trailing end of one sheet and the leading edge of a succeeding sheet in welding relation along the weld pass line, so that the joint to be welded lies transversely to the axis of the strip. Two pairs of welding torches are provided, one torch of each pair being disposed above, and one torch of each pair being disposed below the weld pass line. The upper and lower torches of each pair are mechanically connected together for simultaneous travel. A screw having to one side of its center threads of right hand and to the other side of its center threads of left hand, is mounted parallel to the weld pass line and the torches are provided with nuts riding respectively on these threads so that when the screw is rotated in one direction the upper torches of each pair are simultaneously moved in opposite directions, either toward each other or apart, depending on the direction of rotation of the screw. The lower torches are mechanically connected to their respective upper torches so that they also move simultaneously in opposite directions.

The nozzles of the torches extend toward each other so that when the welding heads to which the torches are attached are in their central or starting position these nozzles overlap each other. The machine is arranged so that at the start of the welding operation the upper and lower torches of one pair are ignited and start their movement outwardly. Thus, during the initial movement of these torches they produce a weld across the center of the joint. As soon as the first pair of torches has traveled far enough to clear the nozzles of the second pair of torches, they are ignited as they are brought into welding position and start their movement in the opposite direction. Thus, during their initial movement they repeat the welding operation across the central portion of the joint. Means are provided to operate, on completion of the welding operation, to return the torches to their starting position.

Two embodiments of the invention are disclosed which operate generally along similar lines but with specific differences. In both embodiments use is made of a lost motion connection so that one pair of welding torches may start operation and perform a weld across the center line of the strips before the other set of welding torches starts to function to reweld said center portion. In one of the embodiments disclosed in Figures 1 to 7 inclusive one set of upper and lower torches are pivotally mounted, and these torches are pivoted away from the work during the period when the first pair of torches are performing their initial welding operation. After the first pair of torches has passed the nozzles of the second pair, the latter are moved or pivoted to their welding position and they then commence their part of the welding operation.

According to another embodiment of the invention, as disclosed in Figures 8 to 11 inclusive, all four of the welding torches are fixed; but again a lost motion connection is provided so that during an initial portion of the operation the second pair of torches follows the first pair of torches until the second pair of torches are ignited whereupon they reverse their direction and traverse the sheet in a normal welding pass.

Coming now to a more detailed description and referring in detail to Figures 1–7 of the drawings:

The machine comprises the table members 10 and 11 to which are secured pole pieces 12, 13, 14 and 15, between pairs of which are mounted the electromagnets 16 and 16a. Separators of non-magnetic material are indicated at 17 and 18. The clamping plates 19 and 20 constitute armatures for the electromagnets and they are mounted by means of guides 21 extending into portions 22 of the frame-work, and the clamping plates are normally maintained in elevated position by the compression springs 23 and 24. When the electromagnet 16 is energized a magnetic circuit is provided through the pole piece 12, one side of the plate or table 10, the sheet 25, the clamping plate 19, the other side of the table 10 and the pole piece 13. A similar circuit is set up in connection with the electromagnet 16a. In this manner the sheet 25 and the sheet 25a which are to be welded together are securely clamped with their edges juxtaposed for the welding operation. The machine frame includes the upright members 26 and 27 in which the screw 28 is journaled and between which extend the rails 29 and 30. The rail 29 is positioned as best seen in Figure 5 so as to provide an inverted V surface, while the rail 30 is positioned to provide a flat surface. Each of the upper welding heads comprises a plate 31 having a V-block 32 to engage the rail 29, and having a bearing surface 33 to ride upon the rail 30. To the underside of the plate 31 there is secured a bracket 34 terminating in a nut 35 which engages the screw 28 so that upon rotation of the screw the nut 35 causes the plate 31 and its associated parts to be translated along the rails 29 and 30.

Both the upper welding heads are translated in the same manner, except that in place of the nut 35 one of the welding heads is provided with the arrangement shown in Figure 7 where the bracket corresponding to the bracket 34 is indicated at 34a. In this instance the nut 35a is not directly connected to the bracket, but instead constitutes an elongated sleeve best seen in Figure 6. The sleeve is provided with terminal flanges 36 and 37 and the sleeve itself may be square in cross section as seen in Figure 7. The nut 35a is retained in a square hole 38 in the bracket 34a of a size which will not permit passage of the terminal flanges 36 and 37.

This structure provides in effect a lost motion arrangement whereby the nut 35a can travel an amount equal to the distance between the insides of the flanges 36 and 37 less the thickness of the bracket 34a before the bracket 34a itself is caused to move. The spacing between the flanges 36 and 37 is such as to permit the torches of the pairs to clear each other, as will be pointed out more clearly hereinafter.

Secured to the front of the plate 31 is the member 40 which will be referred to hereinafter as the welding head. A torch indicated generally at 41 and having a nozzle 42 is mounted in a block 43 which is adjustably secured to the welding head 40 by means of an adjustment which is indicated generally at 44. Torch 41 as best seen in Figure 4, after initial adjustment is held in permanent welding position.

Also attached to the plate 31 is a bracket 51 to which is secured a rod 52. The rod 52 at its other end is secured to a standard 53 mounted upon the block 54. The block 54 as best seen in Figure 1 rides upon the rails 55 and 56. The lower torch 57 which constitutes a pair with the torch 41 is secured by means of a bracket 58 to a block 59. The block 59 is connected to the block 54 by means of a member 60a. By the means just described when the welding head 40 moves, the rod 52 transmits a movement to the block 54 which in turn transmits it to the block 59 and the torch 57.

The block 51 has attached to it by a bracket 61 a rod 62, the purpose of which will be pointed out hereinafter. Similarly, a bar 60a is mounted on the block 59 which also rides on the rails 55 and 56. The function of the bar 60a will also be pointed out hereinafter.

The construction described above in connection with the upper and lower torches to the left in Figures 1, 2, 3, 4 and 6, is substantially duplicate to the torches to the right of these figures, except as pointed out hereinafter and to the extent that the structures are identical the same reference numerals have been used. The nozzle 41a is provided with an arm 67 which is positioned to be abutted by the rod 62 as will be pointed out hereinafter. The lower nozzle 57a is mounted differently than the nozzle 57 in that it is pivotal on a support 68 on the block 59a, and means are provided, as for example, the spring 69, for holding the nozzle 57a in the position of Figure 1. This nozzle is provided with an arm 70 positioned to be abutted by the bar 60a as will be described hereinafter, and an adjusting screw arrangement is provided at 71 to control the operative position of the nozzle 57a.

One pair of nozzles, as for example the nozzles 41 and 57, are provided with the igniting devices 72 which may be of any known type and constitute no part of the present invention.

The fuel connections to the nozzles have been omitted for the sake of clarity, but it will be understood that suitable hose connections are made to each of the four nozzles.

An additional rail is provided at 73 for the mounting of the various limit switches which are arranged to produce automatic operation of the machine. For the purpose of set-up these switches can be moved along a rail 73 and then locked in position by means of set screws. There are shown four limit switches which are arranged to be actuated by an abutment member 74 secured to the plate 31.

The wiring circuits in connection with the various switches have not been shown because they will be within the knowledge of one skilled in the art. They will only be described therefore as to their function, it being understood that suitable wiring and connections are provided to fulfill the necessary functions.

With the welding heads in their starting position as shown in Figure 3, the welding operation is started by pressing a starting button switch suitably provided. This will actuate the motor 77 which is actuated through a speed reducer and controller 78 to the screws 28. The motor may be provided with the conventional brake 79 for quicker stopping. The starting button also actuates the gas valves to furnish gas to the torches 41 and 57, and also actuates the igniters 72.

As soon as the screw 28 begins to rotate, the nut 35 begins to travel toward the left carrying with it the abutment 74. Thus the torches 41 and 57 start their welding operation at once and move toward the left. As this motion withdraws the rods 62 and 60a, torches 41a and 57a are pulled toward the welding position by their respective springs. Shortly thereafter contact 80 drops off the abutment 74 and turns on the fuel to the torches 41a and 57a as they approach their welding positions. These torches are ignited from the torches 41 and 57 so that they need not have their own igniters. Torches 41a and 57a of course have not started to move to the right because of the lost motion device heretofore described in connection with Figures 6 and 7. At this point the torch nozzles will have cleared, the limit of the lost motion will have been reached, and the right hand torches will begin their travel. As contact 82 drops off the abutment 74, the switch 83 turns off the igniters. The welding proceeds until it is completed whereupon the abutment 74 will strike the contact element 84 of the limit switch 85. This switch closes the fuel supply to all the torches and reverses the motor 77 so that all the welding heads begin to return to their starting position. At this point the rods 62 and 60a again come into play in order that the respective nozzles do not interfere with each other, and they strike respectively arms 67 and 70 to cause the torches 41a and 57a to be moved out of the way so as not to interfere with the torches 41 and 57. Finally the member 74 strikes the contact member 86 of the limit switch 87 which stops the motor 77 and constitutes the end of the return cycle.

The ignition of the second pair of torches before they come into their welding positions is important not only to insure that the two welds overlap sufficiently, but also to prevent the undesirable quenching action which the cold welding gas would have on the previously completed weld if ignition were delayed.

It will be clear that in this way one of the great disadvantages of the present devices is overcome. In welding of this type the greatest difficulty is experienced at the beginning of the welding operation. According to the present invention the beginnings of the welding operations overlap somewhat so as to insure a successful weld at the center. From there on no difficulty is had with the quality of the weld.

The machine of Figures 8 to 11 inclusive is, generally speaking, similar in appearance to that of Figures 1 to 7. The table members and magnetic clamping structure may be identical and in the figures they have been given the same reference numerals as before. As in the embodiment previously described, there is a divided lead screw 28 having to one side of the center right hand threads and to the other side of the center left hand threads. This lead screw, as before, is driven by an electric motor 77 through a speed reducer 78 and again the motor is provided with a suitable brake mechanism 79. In this instance there is a slight difference in the way in which the lower welding heads are driven in that the machine is provided with a lower divided lead screw 28a and the lower lead screw 28a is driven from the lead screw 28 through pairs of bevel gears at 100 and 101, and the connecting shaft 102, as best seen in Figure 8. It will be observed that the screw 28a will have an opposite sense of rotation to the screw 28 and therefore the threads on the screw 28a are reversed with regard to their sense on the screw 28.

Since the arrangement of the upper and lower welding heads and the mechanism controlling them is the same, it will suffice to describe just the upper welding heads and their mode of operation. Thus the upper torches 103 and 104 are secured by means of the brackets 105 and 106 respectively to the sliders 107, 108. These sliders, as will be clear, slide on the rods 109 and 110. The slider 107 is secured to its respective nut 111 by means of a U-shaped bracket 113 which is bolted to the slider 107 as at 114 and which has a hole 115 to accept a pin 116 secured to the nut 111. The nut 111 also has a hole through which passes the rod 117. From what has just been said it will be clear that if the lead screw 28 is rotated, the nut 111 will move in one direction or the other depending upon the direction of rotation of the lead screw. As the nut 111 moves on the lead screw, guided also on the rod 117, it carries with it the slider 107 by virtue of the pin 116 engaging the hole 115 in the U-shaped member 113 which is secured to the slider 107, and the torch 103 will be carried along since it is secured to the slider 107.

The slider 108 with the torch 104 is secured to its nut 112 as follows: a J-shaped member 118 is bolted to the nut 108 as at 119 and the long arm 120 of the member 118 is provided with a slot 121 of a width to accommodate the pin 122 which is secured to the nut 112. Secured to the pin 122 is an extension arm 123 provided with a pin 124 from which a spring 125 extends to the far end of the J-shaped member 118 as at 126. The nut 112 is mounted in the same way as the nut 111 so that a description of this mounting is not thought to be necessary.

Figure 10:
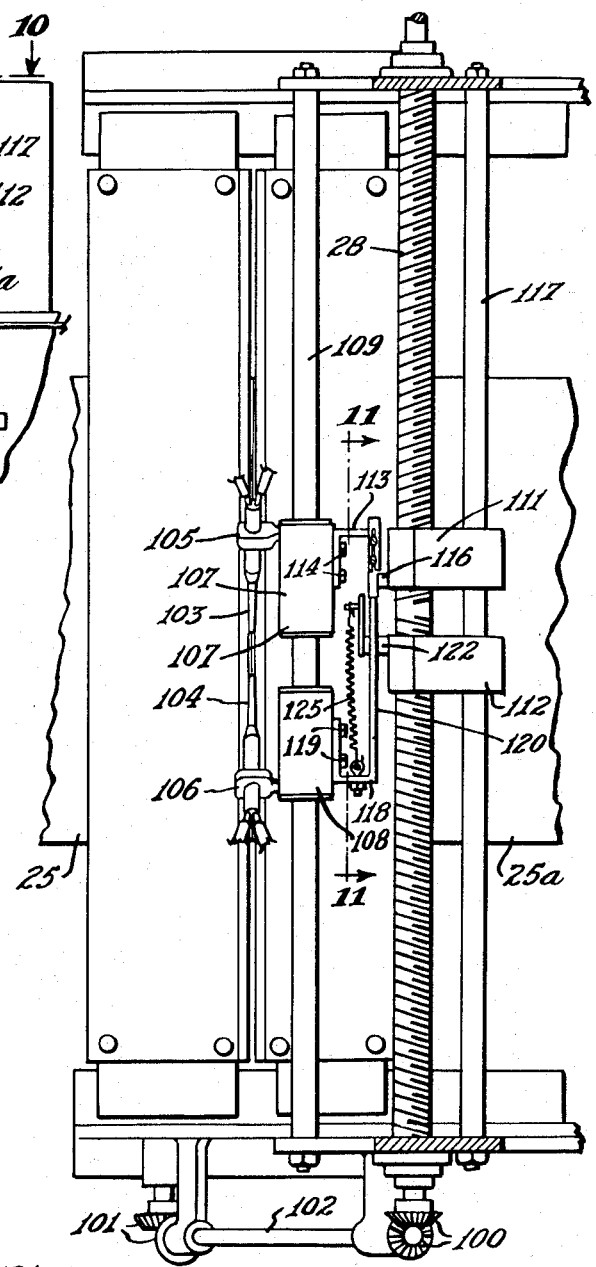
Figure 10 is a horizontal sectional view taken on the line 10—10 of Figure 9.

On the rail 73 are provided a series of switches which have been given the same reference numerals as those in the device of Figures 1 to 7. The parts at the beginning of an operation are in the position shown in Figures 8, 10 and 11. When the starting button is depressed, energizing the motor, the lead screw 28 starts to turn and immediately the nuts 111 and 112 start to move in opposite directions, that is, they start to move apart from each other. The movement of the nut 111 is directly transmitted to the torch 103 which immediately starts to move upward as seen in Figure 10 or to the left as seen in Figure 8. As soon as the contact member 80 rides off the slider 107, the welding torch 103 is ignited by means of its igniter 103a.

Figure 11:
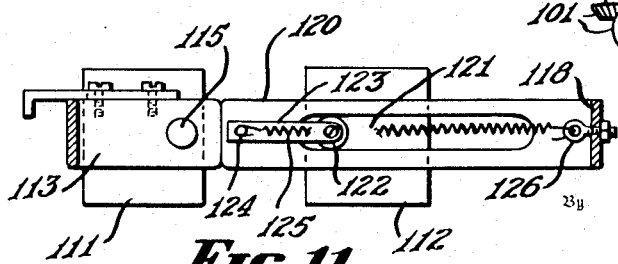
Figure 11 is a fragmentary vertical transverse sectional view taken on the line 11—11 of Figure 10.

While the nut 111, the slider 107 and the torch 103 are moving to the left in Figure 8 and upward in Figure 10, the nut 112 is moving to the right in Figure 8 or downward in Figure 10, but by virtue of the structure best seen in Figure 11 the slider 108 and the torch 104 follow the slider 107 and torch 103. The spring 125 tends to maintain the member 120 abutting the member 113, as best seen in Figure 11, and this action is possible because of the slot 121. Thus, while the nut 112 is moving toward the right or downward in Figure 10, the slider 108 and torch 104 follow the slider 107 and torch 103. This continues until such time as the torch 104 has gone about an inch past where the torch 103 began its welding operation. At this point the contact 82 will have ridden off the slider 107, igniting the torch 104. At this time also the pin 122 will have reached the end of the slot 121 and will enforce a movement of the slider 108 and torch 104 to the right of Figure 8 or downward in Figure 10.

From this point on the torches 103 and 104 are moving apart, both of them ignited and both performing a welding operation. This continues until the slider 107 abuts the contact 84 which shuts off all the torches and causes the motor 77 to reverse. Thereupon the direction of rotation of the screws 28 and 28a is reversed and the nuts, sliders and torches approach each other again. As they approach each other the member 120 will first abut the member 113, as seen in Figure 11, whereupon the spacing between the torches 103 and 104 will be as it was at the outset of the operation and while the torch 103 is completing its movement to starting position, the torch 104 will be caused to reverse itself and back up, again putting the spring 125 under tension until the parts have returned to their starting position. This occurs when the slider 108 abuts the contact 86, shutting off the welding machine entirely.

Figure 9:
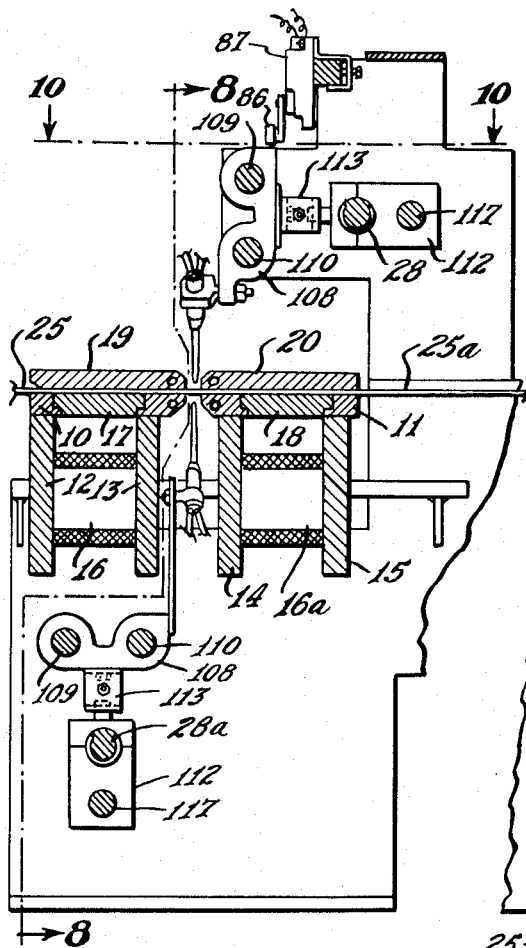
Figure 9 is a vertical longitudinal sectional view of the same taken on the line 9—9 of Figure 8.

The arrangement of the lower welding torches is exactly the same as the arrangement of the upper welding torches except that as seen in Figure 9 the mounting is rotated through ninety degrees as a matter of convenience. The operation is exactly as has been described above, and the description will therefore not be repeated. Similar parts in the lower welding heads have been given similar reference numerals.

The structure described in Figures 7 to 11 inclusive is an improvement over the structure of Figures 1 to 7 inclusive in that it is considered to be simpler and in that it reduces actual welding time approximately forty per cent.

Numerous modifications may be made, particularly as to the details of construction, as to the specific mounting of the various torches, and as to connections between torches, without departing from the spirit of the invention. We therefore do not intend to limit ourselves in any way other than as set forth in the claims which follow.

Having now fully described our invention, what we claim as new and desire to secure by Letters Patent is:

1. In a strip welding machine, a frame, a support on said frame, two torches mounted on said support and arranged for translation along a joint to be welded, said torches having translation ranges along said support in a welding pass which overlap in the central region of said joint whereby a central portion of the joint will be acted upon by both torches, means for translating said torches along said support from the center of said joint to be welded outwardly simultaneously in opposite directions in a welding pass, common driving means for said translating means, and connection between said driving means and one of said torches for delaying the translation of said last named torch in its welding pass until the other has been translated past said central portion of the joint.

2. In a strip welding machine, a frame, a support on said frame, two torches mounted on said support and arranged for translation along a joint to be welded, each of said torches having a translation range along said support in a welding pass exceeding one-half the strip width whereby a central portion of the joint will be acted upon by both torches, means for translating said torches along said support from the center of said joint to be welded outwardly simultaneously in opposite directions in a welding pass, common driving means for said translating means, and a lost motion connection between said driving means and one of said torches for delaying the translation of said last named torch in its welding pass until the other has been translated past said central portion of the joint.

3. A device according to claim 2, in which two additional torches are provided, said additional torches being disposed to operate on the opposite side of said joint, and said additional torches being connected for movement with the respective first mentioned torches.

4. A machine for welding steel sheet material into strips comprising means for clamping the edges of two sheets to be welded, a frame, a support mounted on said frame, at least two torches mounted for movement along said support in a welding pass parallel to the joint to be welded, means for causing one of said torches to commence its welding action to one side of the centerline of said sheets and to weld across said centerline toward the opposite edge of said sheets, means operative when said torch has crossed said centerline by an amount substantially equal to its original off-center displacement to cause said other torch to commence its welding action off center on said opposite side and weld across said centerline toward said one side.

5. A machine for welding steel sheet material into strips comprising means for clamping the edges of two sheets to be welded, a frame, a support mounted on said frame, at least two torches mounted for movement along said support in a welding pass parallel to the joint to be welded, means for causing one of said torches to commence its welding action to one side of the centerline of said sheets and to weld across said centerline toward the opposite edge of said sheets, means operative when said torch has crossed said centerline by an amount substantially equal to its original off-center displacement to cause said other torch to commence its welding action off center on said opposite side and weld across said centerline toward said one side, and means operative upon completion of said welds to cause said torches to return to their starting position.

6. A machine for welding steel sheet material into strips comprising means for clamping the edges of two sheets to be welded, a frame, supports mounted on said frame above and below the sheets to be welded, two pairs of torches, one of each pair being mounted on the support above the joint to be welded and the other being mounted on the support therebelow, said torches being mounted for movement along the respective supports in a welding pass parallel to the said joint, means for causing one pair of said torches to commence their welding action to one side of the centerline of said sheets and to weld across said centerline toward the opposite edge of said sheets, means operative when said one pair of torches has crossed said centerline by an amount substantially equal to its original off-center displacement to cause said second pair of torches to commence their welding action off center on said opposite side and weld across said centerline toward said one side.

7. A machine for welding steel sheet material into strips comprising means for clamping the edges of two sheets to be welded, a frame, supports mounted on said frame above and below the sheets to be welded, two pairs of torches, one of each pair being mounted on the support above the joint to be welded and the other being mounted on the support therebelow, said torches being mounted for movement along the respective supports in a welding pass parallel to the said joint, means for causing one pair of said torches to commence their welding action to one side of the centerline of said sheets and to weld across said centerline toward the opposite edge of said sheets, means operative when said one pair of torches has crossed said centerline by an amount substantially equal to its original off-center displacement to cause said second pair of torches to commence their welding action off center on said opposite side and weld across said centerline toward said one side, and means operative upon completion of said welds to cause said pairs of torches to return to their starting position.

8. In a strip welding machine, a frame, a divided screw having a right hand thread and a left hand thread mounted on said frame, a welding head having a nut engaging said right hand thread, a welding head having a nut engaging said left hand thread, a welding torch pivotally secured to each of said heads, said torches having nozzles which cross each other when said heads are in their central starting position, means for igniting one of said nozzles, means for rotating said screw to cause said one nozzle to be translated along the joint to be welded, a lost motion connection between said screw and the other welding head whereby said second welding head does not start its movement of translation until the first mentioned nozzle has cleared the other nozzle, means for lowering said other nozzle to welding position, and means for reversing the rotation of said screw upon completion of the weld.

9. A device according to claim 8, in which two additional torches are disposed for operation on the opposite side of the joint from said first mentioned torches, each of said additional torches being connected for movement with one of said first mentioned torches.

10. A device according to claim 9, in which means are associated with one of said first mentioned torches and one of said second mentioned torches to actuate respectively the others of said torches to tilt said other torches out of the way of the torches having said means when said torches approach each other in assuming their starting position.

11. In a strip welding machine, a frame, a divided screw having a right hand thread and a left hand thread mounted on said frame, a welding head having a nut engaging said right hand thread, a welding head having a nut engaging said left hand thread, a welding torch pivotally secured to each of said heads, said torches having nozzles which cross each other when said heads are in their central starting position, means for lowering one of said nozzles to welding position, means for igniting said one of said nozzles, means for rotating said screw to cause said one nozzle to be translated along the joint to be welded, a lost motion connection between said screw and the other welding head whereby said second welding head does not start its movement of translation until the first mentioned nozzle has cleared the other nozzle, means for lowering said other nozzle to welding position while said first mentioned nozzle is close enough to ignite the other nozzle, so that cold gases are not permitted to impinge upon the weld performed by said first mentioned nozzle, and means for reversing the rotation of said screw upon completion of the weld.

12. In a strip welding machine, a frame, a support on said frame, two torch carriers mounted on said support, means for translating said torches on said support along a joint to be welded in opposite directions from substantially the center of the strip toward the edges thereof, a torch fixedly secured to one of said carriers with its tip off center of the width of said strip in the direction opposite to its direction of travel in a welding pass, so that during its travel in a welding pass it will weld across the center of said strip, a second torch secured to the other of said carriers through a lost motion connection, spring means to urge said second torch to move in the same direction as said first mentioned torch until the lost motion has been taken up, whereupon said second torch moves with said other carrier.

13. In a strip welding machine, a frame, a support on said frame, two torch carriers mounted on said support, means for translating said torches on said support along a joint to be welded in opposite directions from substantially the center of the strip toward the edges thereof, a torch fixedly secured to one of said carriers with its tip off center of the width of said strip in the direction opposite to its direction of travel in a welding pass, so that during its travel in a welding pass it will weld across the center of said strip, a second torch connected to the other of said carriers through a pin-and-slot connection, spring means to urge said second torch to move in the same direction as said first mentioned torch while its carrier moves in the opposite direction, until said pin has traveled the length of said slot, whereupon said second torch is enforced to move with said other carrier.

14. In a strip welding machine, a frame, a divided screw mounted on said frame having a right hand thread and a left hand thread, a welding head having a nut engaging the right hand thread, a welding head having a nut engaging the left hand thread, a welding torch secured to each of said heads, said torches having nozzles approaching each other to a minimum spacing when said heads are in their central starting position, means for igniting one of said torches, means for rotating said screw to cause said one torch to be translated along the joint to be welded from the center outwardly in one direction, means to move the other welding torch in a welding pass in the opposite direction from the center outwardly, a lost motion connection between said screw and the other welding torch to cause said other welding torch to delay its movement of translation from the center outwardly in the opposite direction until said first welding torch has moved a distance in excess of the original spacing between said torches, means for causing said other welding torch to follow the movement of said first welding torch until said first welding torch has moved a distance in excess of the original spacing between said torches, and means for reversing the rotation of said screw upon completion of the weld.

References Cited in the file of this patent
UNITED STATES PATENTS

| Number | Name | Date |
|---|---|---|
| 448,089 | Starrett | Mar. 10, 1891 |
| 1,065,408 | Thorsby | June 24, 1913 |
| 1,490,608 | Gilmour | Apr. 15, 1924 |
| 1,577,868 | Muller | Mar. 23, 1926 |
| 1,801,140 | Chapman | Apr. 14, 1931 |
| 1,904,599 | Anderson | Apr. 18, 1933 |
| 2,017,933 | Asbury | Oct. 22, 1935 |
| 2,067,549 | Sykes | Jan. 12, 1937 |
| 2,095,964 | Blickman | Oct. 19, 1937 |
| 2,143,969 | Biggert | Jan. 17, 1939 |
| 2,175,615 | Reed | Oct. 10, 1939 |
| 2,219,493 | Reed | Oct. 29, 1940 |
| 2,277,054 | Anderson | Mar. 24, 1942 |
| 2,282,670 | Mitchell | May 12, 1942 |
| 2,344,534 | Bucknam | Mar. 21, 1944 |
| 2,345,688 | Smith | Apr. 4, 1944 |
| 2,347,245 | Anderson | Apr. 25, 1944 |
| 2,410,134 | Stevenson | Oct. 29, 1946 |